United States Patent

Siegfried et al.

[15] 3,677,687
[45] July 18, 1972

[54] APPARATUS FOR RAM FORMING MONOLITHIC PLASTIC ARTICLES

[72] Inventors: Edward C. Siegfried; Conner J. Harwell, both of Meridian, Miss.; Shields L. Murphy, deceased, late of Meridan, Miss. by Ransdell H. Murphy and Carolyn M. Beaner, heirs

[73] Assignee: W. S. Dickey Clay Manufacturing Company, Kansas City, Mo.

[22] Filed: March 23, 1970

[21] Appl. No.: 21,890

Related U.S. Application Data

[62] Division of Ser. No. 721,306, April 15, 1968, Pat. No. 3,557,290.

[52] U.S. Cl. .............................. 425/457, 425/412, 425/195
[51] Int. Cl. ....................................................... B28b 21/50
[58] Field of Search .................. 25/30 R, 39, 31, 35, 37, 120; 425/195, 447, 412, 419, 423, 457

[56] References Cited

UNITED STATES PATENTS

| | | | |
|---|---|---|---|
| 3,495,308 | 2/1970 | Schulze | 25/30 M |
| 3,465,075 | 9/1969 | Siegfreid | 25/39 X |
| 3,558,758 | 1/1971 | Wendt et al. | 264/108 |
| 3,329,758 | 7/1967 | Saurwein | 264/119 X |
| 3,353,214 | 11/1967 | Schulze | 25/30 M X |
| 3,499,067 | 3/1970 | Rogers | 25/3 J X |
| 3,487,140 | 12/1969 | Laux | 25/30 R X |

*Primary Examiner*—J. Spencer Overholser
*Assistant Examiner*—Ben D. Tobor
*Attorney*—Fishburn, Gold and Litman

[57] ABSTRACT

Apparatus for ram forming monolithic plastic articles, which produces articles, such as clay pipe and fittings, without stress lines and without knit or bond lines. The apparatus includes a mold having an elongate cavity having an inside surface configuration corresponding to an outside surface of the article to be formed therein. Bore forming mandrels or rams are movable into the elongate cavity for forcing a compression formed mass of plastic clay to flow around the mandrels and fill the cavity and form the article with bores therein, the mandrels being removable from the cavity and the mold opened for removal of the article.

4 Claims, 8 Drawing Figures

Patented July 18, 1972

INVENTORS
EDWARD C. SIEGFREID,
CONNER HARWELL and
BY SHIELDS MURPHY

Fishburn, Gold and Litman
ATTORNEYS

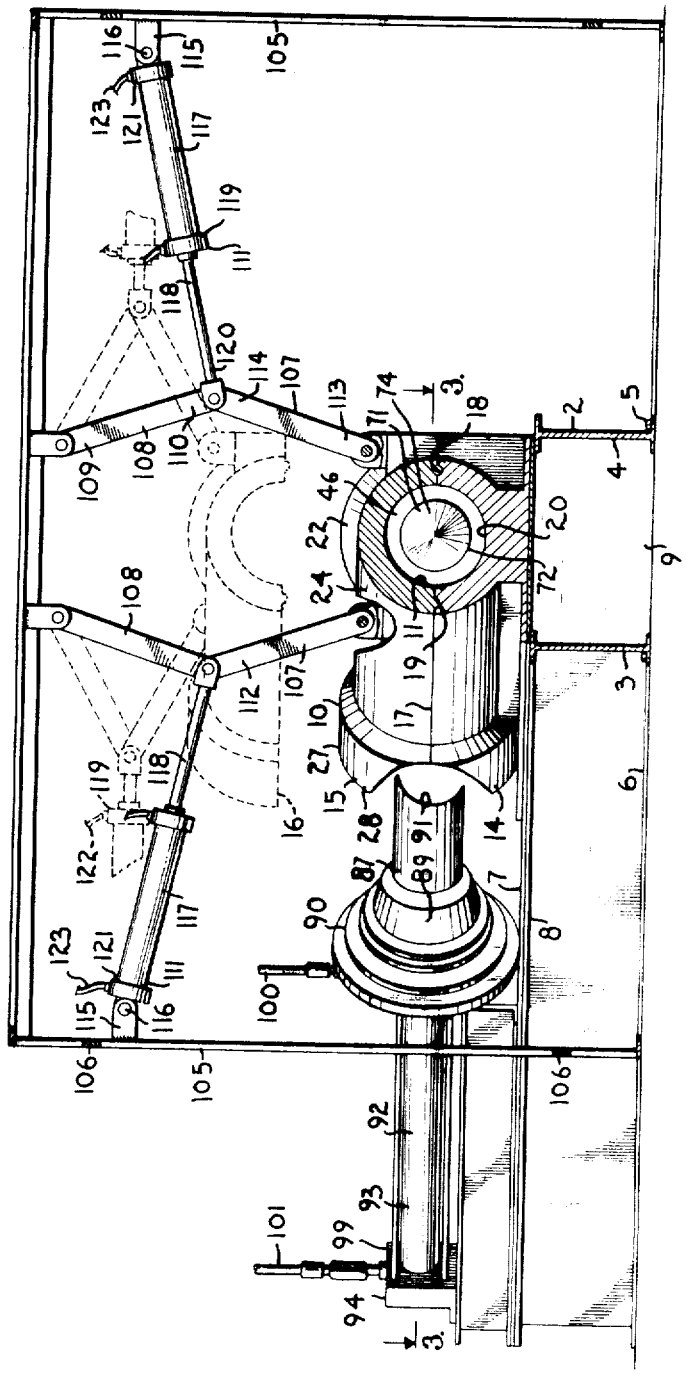

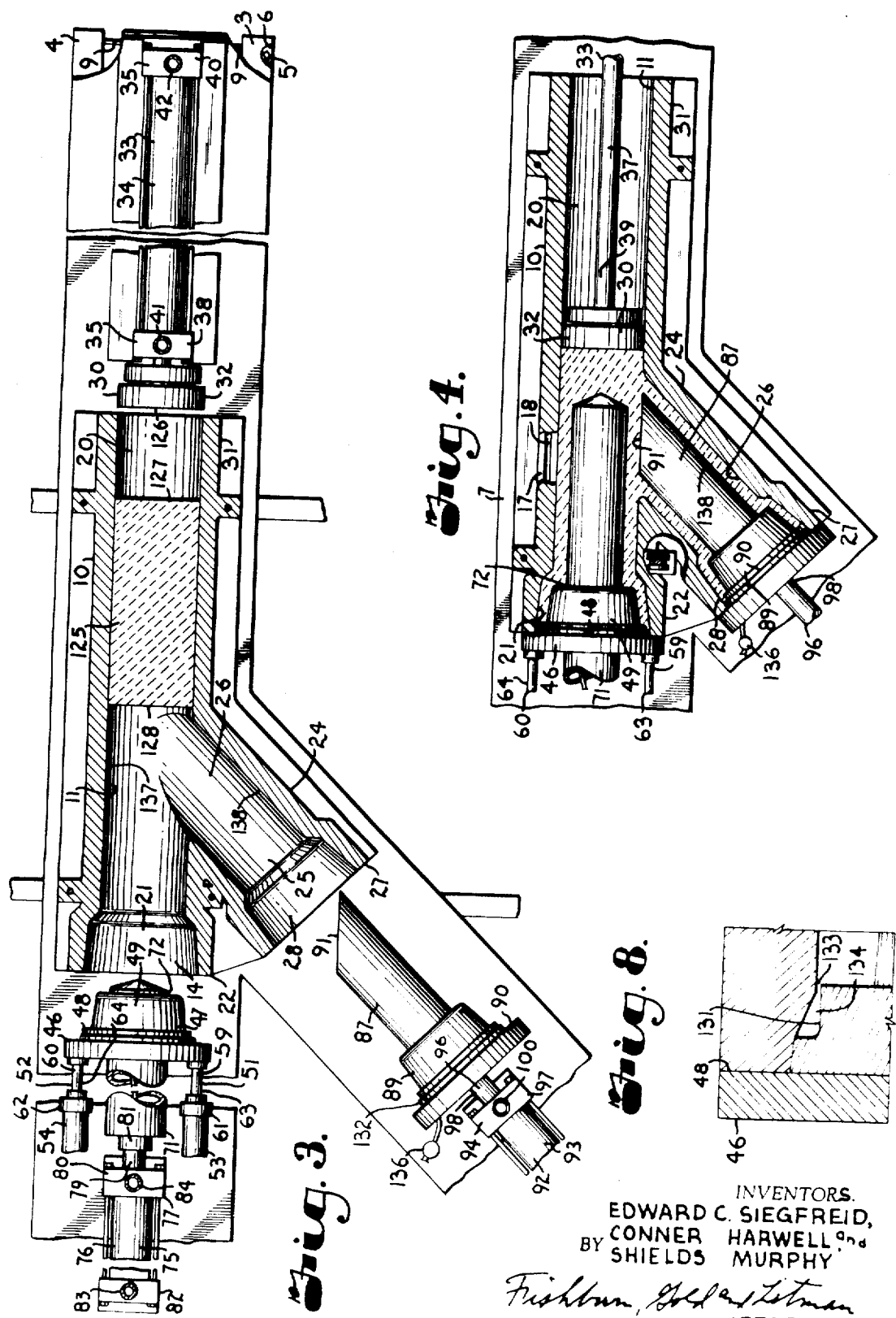

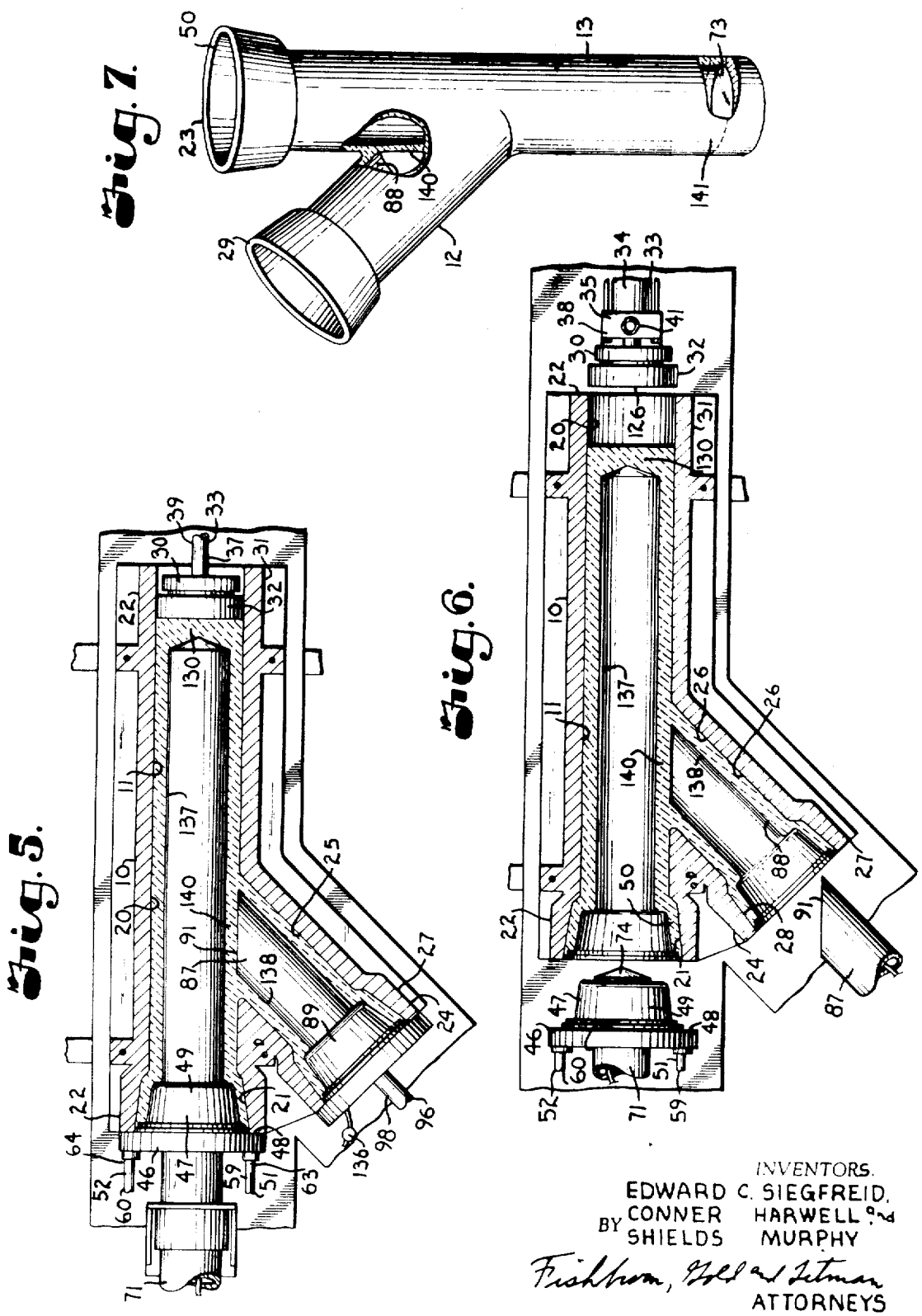

APPARATUS FOR RAM FORMING MONOLITHIC PLASTIC ARTICLES

This application is a division of our copending application, Ser. No. 721,306, filed Apr. 15, 1968, now U.S. Pat. No. 3,557,290, issued Jan. 19, 1971, and entitled Method for Ram Forming Monolithic Plastic Articles, and relates to an apparatus for ram forming monolithic plastic articles having bores therein and particularly to apparatus for ram forming clay pipe and fittings such as tees and wyes and the like.

The principal objects of the present invention are: to provide apparatus for ram forcing of flow of material in a mold to form monolithic plastic articles; to provide such apparatus wherein the articles have bores such as clay pipe and fittings; to provide such apparatus which is simple to operate in high volume production and which results in high quality accurate pipe and fittings at low cost; and to provide apparatus having precise stroke limits for each of the plurality of material working rams whereby the finished article is an accurate high quality item.

Other objects and advantages of this invention will become apparent from the following description taken in connection with the accompanying drawings wherein are set forth by way of illustration and example certain embodiments of this invention.

FIG. 2 is a transverse sectional view through the apparatus taken on line 2—2, FIG. 1.

FIG. 3 is a horizontal sectional view through the apparatus taken on line 3—3, FIG. 2 showing movable parts in their initial positions.

FIG. 4 is a horizontal sectional view similar to FIG. 3 showing a mold cavity closing member at the limit of its inward stroke.

FIG. 5 is a horizontal sectional view similar to FIG. 3 showing a bore forming mandrel at the limit of its inward stroke and the mold cavity closing member held at a selected point in the mold cavity.

FIG. 6 is a horizontal sectional view similar to FIG. 3 showing the ram formed fitting in the mold.

FIG. 7 is a perspective view of a clay fitting formed in the apparatus prepared for trimming.

FIG. 8 is an enlarged fragmentary view showing details of socket former and branch socket former.

REFERRING MORE IN DETAIL TO THE DRAWINGS

Figure 1:
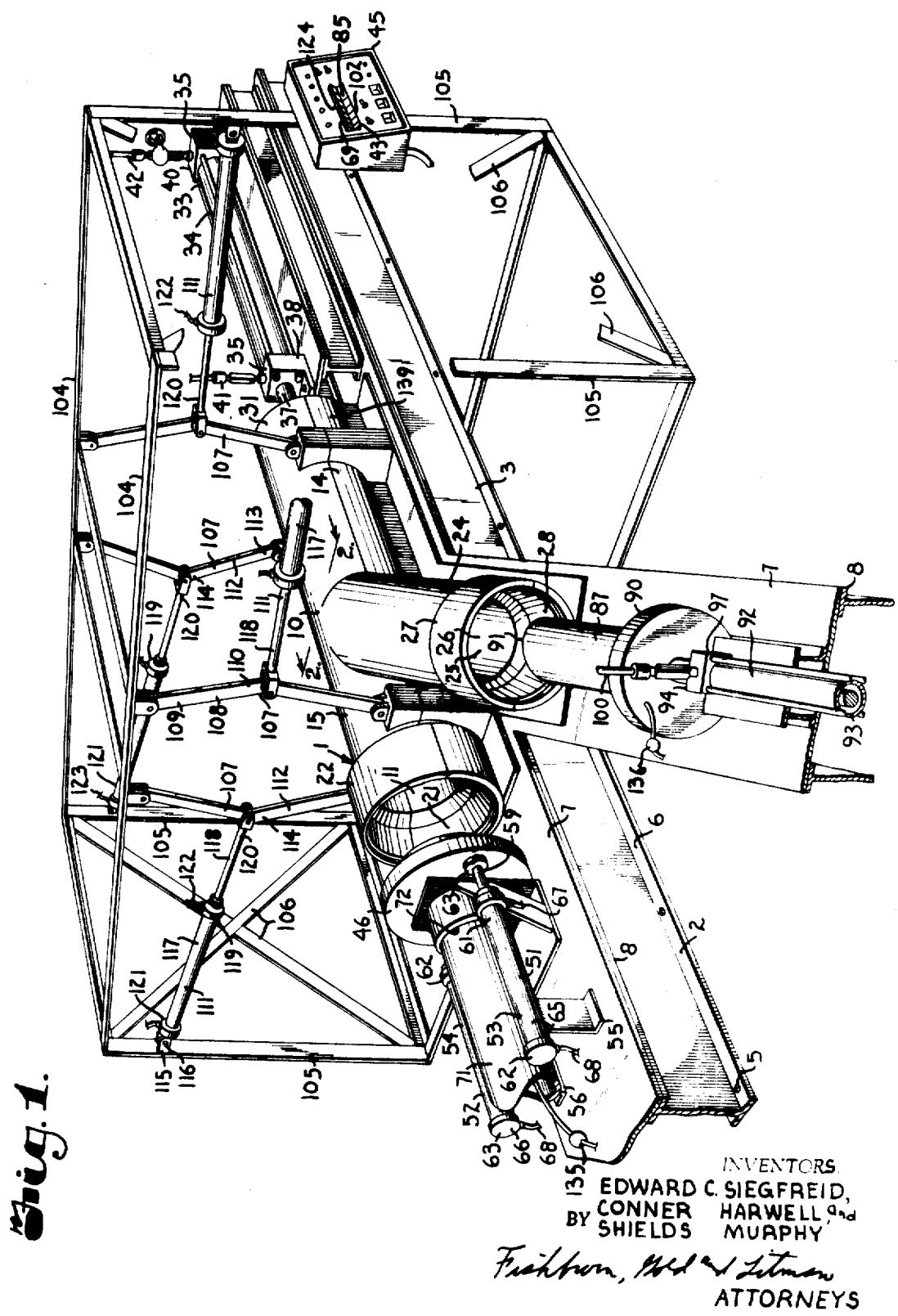
FIG. 1 is a perspective view of apparatus for ram forming monolithic clay fittings embodying features of the present invention.

The reference numeral 1 generally designates an apparatus for ram forming monolithic plastic articles, such as clay pipe and clay pipe fittings. The apparatus illustrated is for forming wye fittings, however, it is to be understood that a straight mold may be used for forming pipe and other molds may be arranged in the shape of desired fittings such as tees, ells, crosses, and the like.

The apparatus 1 includes an elongate base 2 illustrated as laterally spaced structural members, such as beams or channels 3 and 4, mounted on a floor or foundation and secured in position by suitable fastening devices, such as a plurality of anchor bolts 5 anchored in the floor or foundation and engaged with lower flanges 6 of the members 3 and 4. An upper deck member 7 is suitably secured to upper flanges 8 of the structural members 3 and 4, as by welding. The elongate structural members 3 and 4 are connected together by suitable transverse members, such as walls or plates 9, which in the illustrated structure are placed at each end of the base 2 and at least one wall or plate 9 is placed intermediate the ends thereof thereby forming a rigid base structure adapted to resist vertical, longitudinal, and lateral forces developed during ram forming operations.

A mold 10 is mounted on an upper surface of the deck 7 and has an interior surface 11 defining a cavity therein having a configuration generally corresponding to the outside configuration of the finished plastic article, such as clay pipe and fittings. When the article has outwardly extending projections, such as a tee or wye branch 12 of a clay pipe fitting 13, it is necessary that the mold 10 be a split mold having a lower section 14 and an upper section 15. It is preferable that mating surfaces 16 and 17 of the lower and upper sections 14 and 15 respectively be machined surfaces and have such contact as to form a seal. Also suitable mating members are provided to assure precise alignment. In the illustrated structure the mating portions have inter-engaging portions, such as a groove 18 in the mating surface 16 and a rib 19 extending outwardly from the mating surface 17 and having a shape corresponding to the groove 18 thereby precisely aligning the mold sections 14 and 15 and preventing material being forced between the mating surfaces 16 and 17 and any resulting stress lines in the finished article.

While the apparatus is adapted for ram forming monolithic plastic articles of various shapes, the apparatus 1 as illustrated is particularly adapted for ram forming pipe and pipe fittings, such as the clay pipe fitting 13. Therefore in the illustrated structure the mold interior surface 11 defines an elongate cylindrical cavity 20 which has an enlarged bell portion 21 at a bell end 22 of the mold 10 with the interior surface of the enlarged bell portion 21 corresponding to an exterior surface of a bell portion 23 of the clay fitting 13. The mold 10 includes a branch or arm 24 having an elongate cylindrical mold branch cavity 25 therein defined by an interior surface 26. The branch cavity 25 has one end communicating with the cavity 20 defined by the interior surface 11 and a bell end 27 in the form of an enlarged portion 28 having an interior shape corresponding to an outside surface of a bell portion 29 of the tee or wye branch 12.

A mold cavity closing member 30 is extendible into a spigot end 31 of the mold 10 and movable longitudinally within the cavity 20 defined by the interior surface 11. The mold cavity closing member 30 is illustrated as an elongate cylindrical member of uniform cross section and having a side wall 32 with an exterior diameter effecting a tight fit with the surface 11 of the mold cavity 20 therefore the side wall 32 slidingly and sealingly engages the interior surface 11. It is therefore preferable that the interior surface 11 and the mold cavity closing member side wall 32 each be machined to provide the tight fit thereby preventing the clay from flowing between the interior surface 11 and the side wall 32.

An operating member or extensible member 33 is operatively connected with the mold cavity closing member 30 to move same longitudinally within the cavity 20. The extensible member 33 consists of a cylinder 34 suitably secured upon the deck 7, as by brackets 35 of the cylinder 34 being welded thereto. A piston is reciprocable in the cylinder 34 and has a piston rod 37 that extends through a forward end 38 of the cylinder 34 with the free end 39 of the piston rod 37 being operatively connected to the mold cavity closing member 30. In the illustrated structure, withdrawing the piston rod 37 into the cylinder 34 moves the mold cavity closing member 30 out of the spigot end 31 of the mold 10 and extending the piston rod 37 extends the mold cavity closing member 30 into the mold cavity 20 defined by the interior surface 11.

Suitable fluid, such as hydraulic fluid, under pressure is applied to the forward end 38 and a rear end 40 of the cylinder 34 through suitable flexible hoses or tubes 41 and 42 respectively under control of a lever 43 which is operatively connected to a suitable control valve (not shown) positioned in a control panel 45 whereby when fluid pressure is introduced into the forward end 38 of the cylinder 34 the piston rod 37 is withdrawn into the cylinder 34 to withdraw the mold cavity closing member 30 from the cavity 20 of the mold 10 and when fluid pressure is introduced into the rear end 40 of the cylinder 34 the piston rod 37 is extended outwardly from the cylinder 34 thereby moving the mold cavity closing member 30 longitudinally into the mold cavity 20 defined by the interior surface 11.

A closure member 46 is adapted to close the bell end 22 of the mold 10 and has an integral socket former 47 extending outwardly from a mold engaging face 48. The socket former 47 extends longitudinally into the bell portion 21 and has an edge or rim 49 radially inwardly spaced from the surface of the bell portion 21 of the mold cavity 20 a distance corresponding to the thickness of a wall 50 of the clay pipe bell portion 23 and has an exterior surface corresponding to the interior surface of the clay pipe bell portion 23.

The closure member 46 and the socket former 47 may be manually moved into position at the bell end 22, however, it is preferable that suitable power means, such as a pair of extensible members 51 and 52, be operatively connected to the closure member 46 to move the socket former 47 into and out of the enlarged bell portion 21. The extensible members 51 and 52 each consist of a cylinder 53 and 54 respectively which is suitably mounted on the deck 7, as by brackets 55 and 56. Pistons are reciprocable in the cylinders 53 and 54 respectively and each have piston rods 59 and 60 respectively that extend through forward ends 61 and 62 of the cylinders 53 and 54 respectively with free ends 63 and 64 of the piston rods 59 and 60 being operatively connected to the closure member 46. In the illustrated structure, simultaneously extending the piston rods 59 and 60 outwardly from the respective cylinders 53 and 54 moves the closure member 46 to close the bell end 22 of the mold 10 and moves the socket former 47 into the enlarged bell portion 21 and withdrawing the piston rods 59 and 60 into the cylinders 53 and 54 respectively moves the closure members 46 away from the bell end 22.

Suitable fluid such as hydraulic fluid, under pressure is applied to the forward ends 61 and 62 and rear ends 65 and 66 of the cylinders 53 and 54 through suitable flexible hoses or tubes 67 and 68 respectively under control of a lever 69 which is operatively connected to a suitable control valve positioned in the control panel 45 whereby when fluid pressure is introduced into the rear ends 65 and 66 of the cylinders 53 and 54 through the hoses 68, the piston rods 59 and 60 are simultaneously extended outwardly from the respective cylinders 53 and 54 to move the closure member 46 and socket former 47 to close the bell end 22 of the mold 10 and when fluid under pressure is introduced into the forward ends 61 and 62 of the cylinders 53 and 54 through the hoses 67 the closure member 46 and socket former 47 are withdrawn from the bell end 22.

A bore forming mandrel 71 is movable through a passageway 72 through the closure member 46 and socket former 47. The bore forming mandrel 71 is an elongate cylindrical member having an exterior diameter corresponding to the internal diameter of a body portion 73 of the clay fitting 13. A forward face 74 of the bore forming mandrel 71 is pointed for penetrating and moving through the clay and is illustrated as having a generally conical shape. The bore forming mandrel 71 is movable longitudinally within the mold cavity 20 defined by the interior surface 11 and is movable independently of the closure member 46 and socket former 47.

A suitable operating member or extensible member 75 is operatively connected to the bore forming mandrel 71 to extend and retract same. The extensible member 75 consists of a cylinder 76 suitably supported on the deck 7, as by cylinder brackets 77 being welded to the deck 7, and is preferably positioned between the cylinders 53 and 54. A piston is reciprocable in the cylinder 76 and has a piston rod 79 that extends through a forward end 80 of the cylinder 76 with the free end 81 of the piston rod 79 being operatively connected to the bore forming mandrel 71. In the illustrated structure, extending the piston rod 79 outwardly from the forward end 80 of the cylinder 76 moves the bore forming mandrel 71 longitudinally within the cavity 20 defined by the interior surface 11 and withdrawing the piston rod 79 into the cylinder 76 removes the bore forming mandrel 71 from the bell end 22 of the mold 10.

Suitable fluid, such as hydraulic fluid, under pressure is applied to the forward end 80 and a rear end 82 of the cylinder 76 through suitable hoses or tubes 83 and 84 under control of a lever 85 which is operatively connected to a suitable control valve positioned in the control panel 45 whereby when fluid pressure is introduced into the rear end of the cylinder 76 through the hose 83, the piston rod 79 is extended outwardly from the forward end 80 of the cylinder 76 to move the bore forming mandrel 71 into and through the cavity 20 defined by the interior surface 11 and when fluid pressure is introduced into the forward end 80 of the cylinder 76 through the hose 84 the piston rod 79 is withdrawn into the cylinder 76 to withdraw the bore forming mandrel 71 from the cavity 20 of the mold 10.

A branch bore forming member 87 is movable into the branch or arm 24 of the mold 10 and is illustrated as an elongate cylindrical member having an exterior diameter corresponding to an internal diameter of a body portion 88 of the tee or wye branch 12. An enlarged portion intermediate the ends of the branch bore forming member 87 is shaped to form a branch socket former 89 and is positioned within the enlarged portion 28 of the branch 24 and has an exterior surface radially inwardly spaced from the surface defining the enlarged portion 28. The exterior surface of the branch socket former 89 corresponds to the interior surface of the bell portion 29 of the tee or wye bramch 12. A flange 90 extends outwardly from the branch socket former 89 and is positioned to close the bell end 27 of the branch or arm 24 of the mold 10.

In the illustrated structure, the flange 90 and the branch socket former 89 are integral with the branch bore forming member 87 thereby positioning one end 91 thereof within the mold cavity 20 defined by the interior surface 11. The face at one end 91 of the branch bore forming member 87 is arcuate and is radially spaced outwardly from the exterior surface of the bore forming mandrel 71 when same is in the cavity 20 defined by the interior surface 11.

The branch bore forming member 87 may be manually moved into position within the branch or arm 24 and suitably secured to the mold 10, however, it is preferable that a suitable operating member or extensible member 92 be operatively connected to the branch bore forming member 87 to position same within the mold branch or arm 24 and to remove same therefrom. The extensible member 92 consists of a cylinder 93 suitably supported on the deck 7, as by brackets 94 of the cylinder 93 being welded thereto. A piston is reciprocable in the cylinder 93 and has a piston rod 96 that extends through a forward end 97 of the cylinder 93 with a forward end 98 of the piston rod 96 being operatively connected to the branch bore forming member 87. In the illustrated structure, extending the piston rod 96 outwardly from the forward end 97 of the cylinder 93 moves the branch bore forming member 87 into position within the mold branch or arm 24 and withdrawing the piston rod 96 into the cylinder 93 removes the branch bore forming member 87 from the branch or arm 24.

Suitable fluid, such as hydraulic fluid, under pressure is applied to the forward end 97 and a rear end 99 of the cylinder 93 through suitable hoses or tubes 100 and 101 respectively under control of a lever 102 which is operatively connected to a suitable control valve positioned in the control panel 45 whereby when fluid pressure is introduced into the rear end 99 of the cylinder 93 through the hose 101 the piston rod 96 is extended outwardly from the forward end 97 of the cylinder 93 to move the branch bore forming member 87 and the flange 90 into engagement with and closing the bell end 27 of the mold branch or arm 24 and when fluid pressure is introduced into the forward end 97 of the cylinder 93 through the hose 100 the piston rod 96 is withdrawn into the cylinder 93 to remove the branch bore forming member 87 from the mold branch or arm 24.

An abutment member 104 is in a fixed position above the base 2 and is adapted to resist forces exerted by members holding the upper mold section 15 if firm engagement with the lower mold section 14. Suitable columns 105 extend upwardly from the base 2 and support the abutment member 104 and the columns 105 are suitably braced, as by bracing members 106, to resist longitudinal and lateral forces exerted on the mold 10 by the mold cavity closing member 30 and the bore forming mandrel 71.

Suitable linkage, such as opposed scissor linkages 107 are operatively connected to the abutment member 104 and to the upper mold section 15 to hold same in engagement with the lower mold section 14 and to move same vertically away from the lower mold section 14.

In the illustrated structure, the scissor linkages 107 each include an upper link 108 having an upper end 109 pivotally connected to the abutment member 104 and the lower end 110 pivotally connected to a suitable power operated extensible member 111 and a lower link 112 having a lower end 113 pivotally connected to the upper mold section 15 and the upper end 114 pivotally connected to the extensible member 111. It is preferable that the scissor linkages 107 be in laterally spaced pairs with the pairs being longitudinally spaced along the mold 10.

The extensible members 111 are mounted in axially aligned pairs and in the illustrated structure, one end of each cylinder is suitably pivotally connected to a bracket 115 mounted on the respective column 105, as by a suitable pin 116 extending through the respective bracket 115. Each of the extensible members 111 consists of a cylinder 117 having a piston reciprocable therein and a piston rod 118 that extends outwardly from a forward end 119 of the cylinder 117 with a forward end 120 of the piston rod 118 being pivotally connected to the upper and lower links 108 and 112. In the illustrated structure, simultaneously withdrawing each of the pair of aligned piston rods 118 into the cylinders 117 raises the upper mold section 15 and extending the piston rods 118 outwardly from the cylinders 117 lowers the upper mold section 15 into engagement with the lower mold section 14 whereby the mold sections 14 and 15 cooperate with the mold cavity closing member 30 and the bore forming mandrel 71 to maintain the clay in compression during ram forming of the clay within the mold 10.

Suitable fluid, such as hydraulic fluid, under pressure is applied to the forward end 119 and a rear end 121 of each of the respective cylinders 117 through suitable hoses or tubes 122 and 123 respectively under control of a lever 124 which is operatively connected to a suitable control valve positioned in the control panel 45 whereby when fluid pressure is introduced into the rear end 121 of each of the cylinders 117 through the hoses 123 the piston rods 118 are extended outwardly from the forward ends 119 of the cylinders 117 to lower the upper mold section 15 into interlocking engagement with the lower mold section 14 and when fluid pressure is introduced into the forward end 119 of each of the cylinders 117 through hoses 122 the piston rods 118 are withdrawn into the cylinders 117 to raise the upper mold section 15 upwardly away from the lower mold section 14.

In the ram forming of the clay pipe and fittings an elongate compression formed clay cylinder 125 is placed in the mold cavity 20 defined by the interior surface 11 and the upper mold section 15 is secured to the lower mold section 14 by operation of the extensible members 111. The closure member 46 and the socket former 47 are positioned in the bell end 22 of the mold 10 by simultaneous operation of the extensible members 51 and 52 and the branch bore forming member 87 is positioned within the bell end 27 and within the branch 24 by operation of the extensible member 92. The mold cavity closing member 30 is then moved into the mold cavity 20 defined by the interior surface 11 until a mold cavity closing member face 126 engages one end 127 of the clay cylinder 125 and moves the cylinder 125 toward the closure member 46 and the socket former 47 by operation of the extensible member 33. The other end 128 of the clay cylinder 125 is thereby forced to flow around the socket former 47 and into the enlarged bell portion 21 and an intermediate portion of the clay cylinder 125 is forced to flow into the mold branch 24 and into the enlarged portion 28 therein and around the branch bore forming member body portion 88 and socket former 89 thereby forming the branch 12 and the bells 23 and 29. The bore forming mandrel 71 is then extended through the passageway 72 and into the other end 128 of the clay cylinder 125 through operation of the extensible member 75 with a force sufficient to penetrate the clay cylinder 125 and overcome the force exerted by the mold cavity closing member 30 thereby forcing same to move outwardly from the mold cavity 20 defined by the interior surface 11. The outwardly movement of the mold cavity closing member 30 is stopped at a selected point within the mold cavity 20 by closing a shut-off valve in the hose 42 to the rear end 40 of the cylinder 34 thereby holding the mold cavity closing member 30 in a selected position while the bore forming mandrel 71 continues to move toward the face 126 of the mold cavity closing member 30. At the end of the inward stroke of the bore forming mandrel 71 a portion 130 of the clay cylinder 125 remains between the forward face 74 of the bore forming mandrel 71 and the face 126 of the mold cavity closing member 30. The ram forming of the clay pipe fitting 13 is thereby completed and pressure is relaxed on the mold cavity closing member 30 and on the bore forming mandrel 71 which are removed from the mold 10.

A shoulder 131 on the socket former 47 and a shoulder 132 on the branch socket former 89 are each slightly spaced from the interior surface of the bell portion 21 of the mold 10 and from the interior surface of bell portion 28 of the mold branch or arm 24 respectively thereby defining a narrow passageway 133 which is enlarged into a small chamber 134. The passage 133 and the chamber 134 provide a space into which the clay is forced thereby insuring that the space within the bell portions 21 and 28 are each completely filled and that the material therein is properly compacted. The bell portions 23 and 29 are thereby formed of solid material which is properly compacted and free from defects.

It is noted that when the bore forming mandrel 71 and the branch bore forming member 87 are removed, low pressure air in the nature of one to two pounds per square inch above atmospheric pressure is introduced through suitable check valves 135 and 136 at the end of the bore forming mandrel 71 and the branch bore forming member 87 respectively thereby preventing a vacuum being formed within a bore 137 formed by the bore forming mandrel 71 and a bore 138 formed by the branch bore forming member 87 whereby collapse of the bores 137 and 138 is prevented until the upper mold section 15 is removed.

The clay pipe fitting 13 is removed from the mold 10 by activating the extensible members 111 to raise the upper mold section 15 and tilting the lower mold section 14 about a spigot end 139 of the mold 10 and inserting a suitable finishing mandrel (not shown) into the fitting 13.

A wall 140 is formed between the arcuate face 91 of the branch bore forming member 87 and the bore forming mandrel 71 which must then be removed by cutting a bore or passageway therethrough having a diameter corresponding to the bore 138 in the tee or wye branch 12. A spigot end 141 of the clay fitting 13 is formed by cutting off the portion 130 of clay formed between the face 126 of the mold cavity closing member 30 and the forward face 74 of the bore forming mandrel 71. The material formed in the passageway 133 and chamber 134 is also cut off to finish the bell portions 23 and 29 respectively. The clay fitting 13 is then further treated by glazing and firing in a conventional manner.

It is important to precisely position the bore forming mandrel 71 and the branch bore forming member 87 within the mold 10 and securely hold same while the mold cavity closing member 30 forces the clay of the cylinder 125 to flow therearound and fill the bell end 22 of the mold 10 and the bell end 27 of the branch 24. It is important that the bell ends 22 and 27 be filled simultaneously to avoid the formation of a slippage plane or imperfection in the fitting 13.

While apparatus has been illustrated and described for ram forming of the clay fitting 13, it is to be understood that the apparatus may be modified to ram form double tees or wyes by addition of another mold branch and branch bore forming member (not shown). Standard clay pipe with and without the bell portion 23 may also be ram formed in the mold 10 by omitting the mold branch 24 or mold branches, the bell portion 21 of the mold cavity 20 being omitted for plain end clay pipe.

It is to be understood that while certain forms of this invention have been illustrated and described, it is not to be limited to the specific form or arrangement of parts herein described and shown.

What we claim and desire to secure by Letters Patent is:

1. An apparatus for ram forming monolithic clay pipe having a bore therethrough comprising:
   a. an elongate mold having an interior surface defining an elongate cavity therein;
   b. an elongate bore forming mandrel extending into one end of and movable longitudinally within said mold cavity, said bore forming mandrel being spaced radially inwardly from said mold interior surface;
   c. an enlarged bell cavity portion at said one end of said mold cavity;
   d. a socket former mounted on said mold and closing said one end of said mold cavity, said socket former having a surface spaced radially inwardly from said enlarged bell cavity portion and a face extending into said mold cavity thereby defining the bell portion of the pipe;
   e. a passage way through said socket former, said passageway being coaxial with said mold cavity for permitting said bore forming mandrel to move therethrough and into said mold cavity;
   f. said pipe having a branch extending outwardly at an angle with the longitudinal angle of said pipe, said branch having a bore therethrough communicating with the pipe bore and a bell portion;
   g. an elongate mold branch having an interior surface defining an elongate cylindrical branch cavity therein, one end of said elongate cylindrical branch cavity communicating with said elongate cylindrical mold cavity;
   h. an enlarged bell cavity portion at the other end of said mold branch cavity;
   i. a branch socket former mounted on said mold branch and closing the other end of said mold branch cavity, said branch socket former having a surface spaced radially inwardly from said enlarged bell cavity portion of said branch cavity and extending into said branch cavity;
   j. a branch bore forming member extending longitudinally through said mold branch cavity, said bore forming member coaxial with and within said mold branch cavity.
   k. a tight fitting mold cavity closing member extending into the other end of and movable longitudinally within said mold cavity, said mold cavity closing member having a surface slidingly engaging said mold interior surface, said mold cavity closing member having a face engageable with one end of an elongated cylinder of clay within said mold cavity;
   l. means operatively connected with said mandrel and said closing member and said mold for effecting relative movement thereof in moving the clay in the cavity;
   m. said socket former having a mold engaging flange for closing said one end of said mold cavity;
   n. said socket former having a shoulder adjacent said mold engaging flange, said socket former shoulder having a surface spaced radially inwardly from an interior surface of said mold bell cavity thereby defining a chamber of reduced size adjacent said mold bell cavity;
   o. said branch socket former having a mold branch engaging flange for closing said mold branch, and
   p. said branch socket former having a shoulder adjacent said mold branch engaging flange, said branch socket former shoulder having a surface spaced radially inwardly from an interior surface of said bell cavity portion of said mold branch thereby defining a cavity of reduced size adjacent said branch mold cavity.

2. An apparatus for ram forming monolithic clay pipe having a bore therethrough comprising:
   a. an elongate mold having an interior surface defining an elongate cavity therein;
   b. an elongate bore forming mandrel extending into one end of and movable longitudinally within said mold cavity, said bore forming mandrel being spaced radially inwardly from said mold interior surface;
   c. an enlarged bell cavity portion at said one end of said mold cavity;
   d. a socket former mounted on said mold and closing said one end of said mold cavity, said socket former having a surface spaced radially inwardly from said enlarged bell cavity portion and a face extending into said mold cavity thereby defining the bell portion of the pipe;
   e. a passageway through said socket former, said passageway being coaxial with said mold cavity for permitting said bore forming mandrel to move therethrough and into said mold cavity;
   f. a tight fitting mold cavity closing member extending into the other end of and movable longitudinally within said mold cavity, said mold cavity closing member having a surface slidingly engaging said mold interior surface, said mold cavity closing member having a face engageable with one end of an elongate cylinder of clay within said mold cavity;
   g. means operatively connected with said mandrel and said closing member and said mold for effecting relative movement thereof in moving the clay in the cavity;
   h. said socket former having a mold engaging flange for closing said one end of said mold cavity;
   i. said socket former having a shoulder adjacent said mold engaging flange, said socket former shoulder having a surface spaced radially inwardly from an interior surface of said mold bell cavity thereby defining a chamber of reduced size adjacent said mold bell cavity.

3. The apparatus for ram forming a monolithic clay pipe as set forth in claim 2 wherein said means operatively connected with said mandrel and said closing member for effecting relative movement with said mold includes:
   a. extensible means operatively connected to said mold cavity closing member for moving same into and out of said mold cavity,
   b. second extensible means operatively connected to said bore forming mandrel for moving same into and out of said mold cavity, and
   c. valve means associated with said first named extensible means for holding said mold cavity closing member face with a selected force against a force exerted thereon by said bore forming mandrel moving through said clay cylinder toward said mold cavity closing member face and permitting retractive movement of said mold cavity closing member in response to a greater force on the mandrel.

4. An apparatus for ram forming monolithic clay pipe fitting having a bore therethrough comprising:
   a. an elongate mold having an interior surface defining and elongate cavity therein, said mold having at least two sections, said sections being separable and having cooperating interengageable mating surfaces for aligning said mold sections;
   b. an elongate bore forming mandrel extending into one end of and movable longitudinally within said mold cavity, said bore forming mandrel being spaced radially inwardly from said mold interior surface;
   c. closing means mounted on said mold and closing said one end of said mold cavity;
   d. a passageway through said closing means, said passageway being coaxial with said mold cavity for permitting said bore forming mandrel to move therethrough and into said mold cavity;
   e. said pipe having a branch extending outwardly at an angle with the longitudinal angle of said pipe, said branch having a bore therethrough communicating with the pipe bore and the bell portion;
   f. an elongate mold branch having an interior surface defining an elongate cylindrical branch cavity therein, one end of said elongate cylindrical branch cavity communicating with said elongate cylindrical mold cavity;

g. a branch closing means mounted on said mold branch and closing the other end of said mold branch cavity;

h. a branch bore forming member extending longitudinally through said mold branch cavity, said bore forming member coaxial with and within said mold branch cavity, said pipe bore forming mandrel and said branch bore forming member being hollow;

i. a tight fitting mold cavity closing member extending into the other end of and movable longitudinally within said mold cavity, said mold cavity closing member having a surface slidingly engaging said mold interior surface, said mold cavity closing member having a face engageable with one end of an elongate cylinder of clay within said mold cavity;

j. means operatively connected to said tight fitting mold cavity closing member to apply a force to move same toward said one end of the mold cavity to force the clay into engagement with the means closing said one end of the mold cavity and said other end of the mold branch cavity and maintain said force;

k. means operatively connected with said mandrel to move same into the clay and longitudinally of the mold cavity with a force greater than the force applied to said tight fitting mold cavity closing member to effect the movement thereof towards said other end of the mold cavity as the mandrel moves therein and maintain the clay compressed by said forces;

l. said tight fitting mold cavity closing member and said bore forming mandrel and said branch bore forming member being removable from said mold whereby the clay fitting is removable from said mold sections;

m. a source of air under pressure communicating with the interior of said pipe bore forming mandrel and branch bore forming member;

n. valve means for controlling flow of air into said mandrel and branch bore forming member to apply air pressure within bores formed by said mandrel and said branch bore forming member during removal thereof from said mold.

* * * * *